July 9, 1968
M. R. CARO
3,391,751
DRILLING APPARATUS
Original Filed Aug. 6, 1962
4 Sheets-Sheet 1
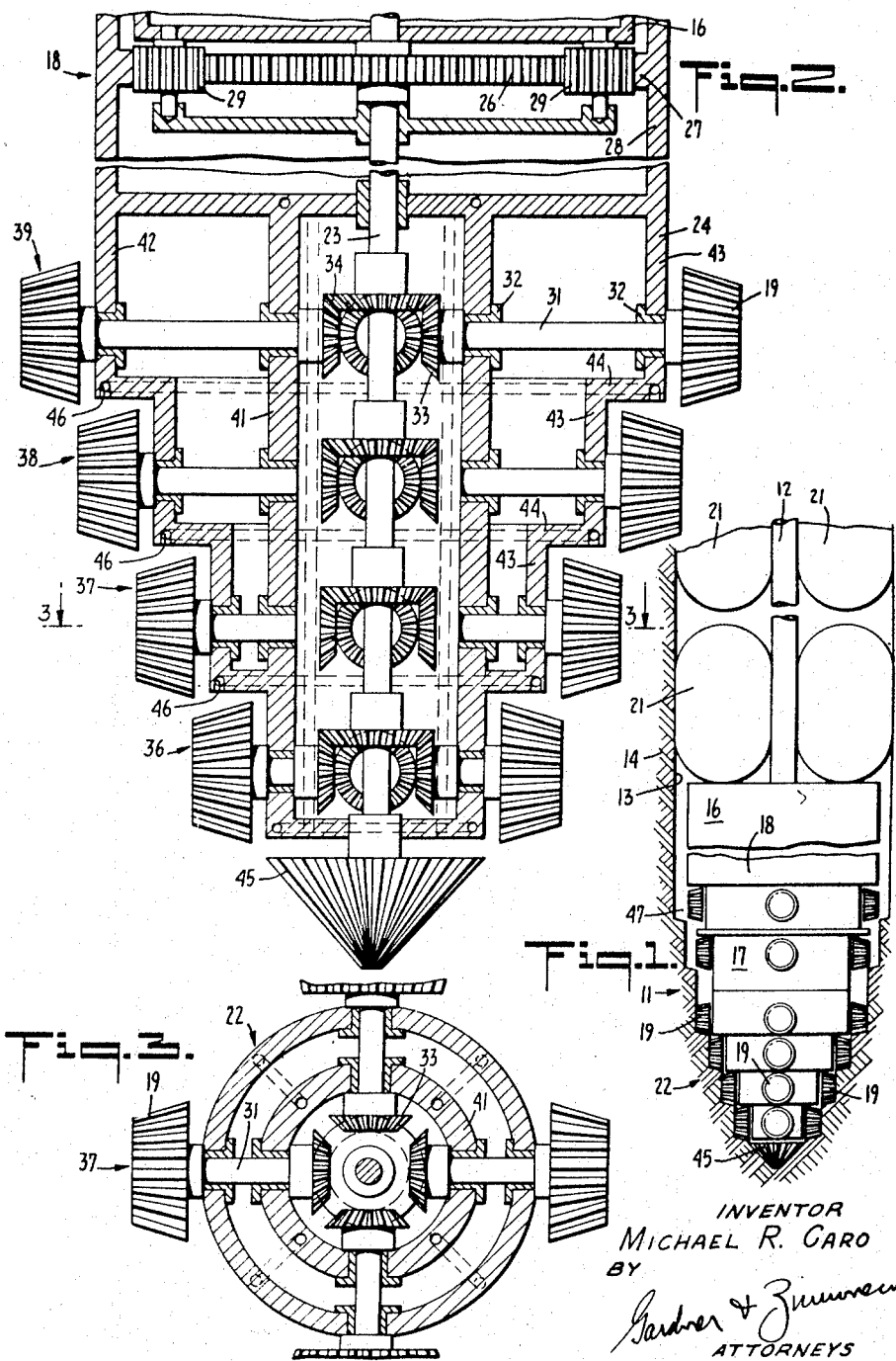
INVENTOR
MICHAEL R. CARO
BY
Gardner & Zimmerman
ATTORNEYS

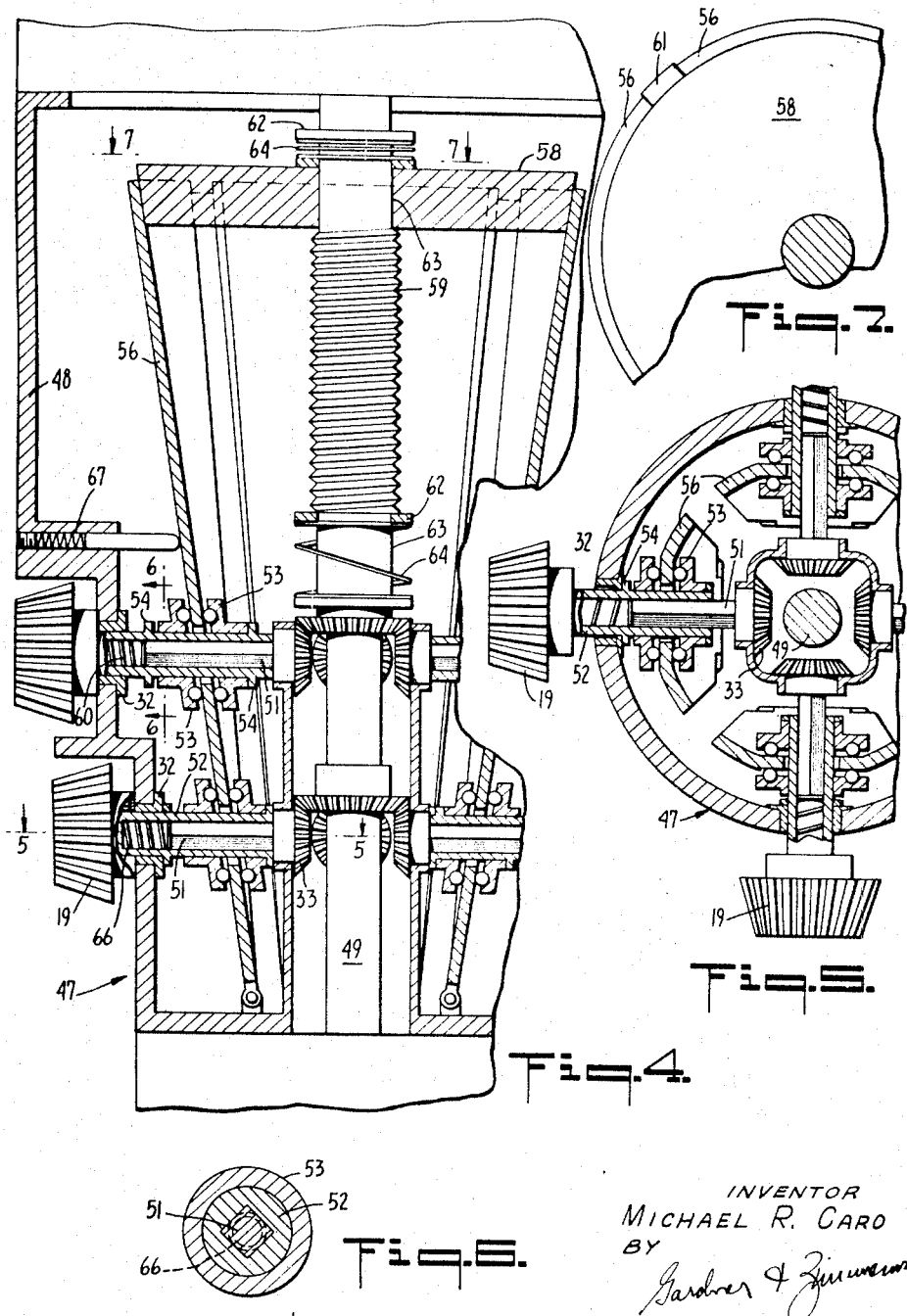

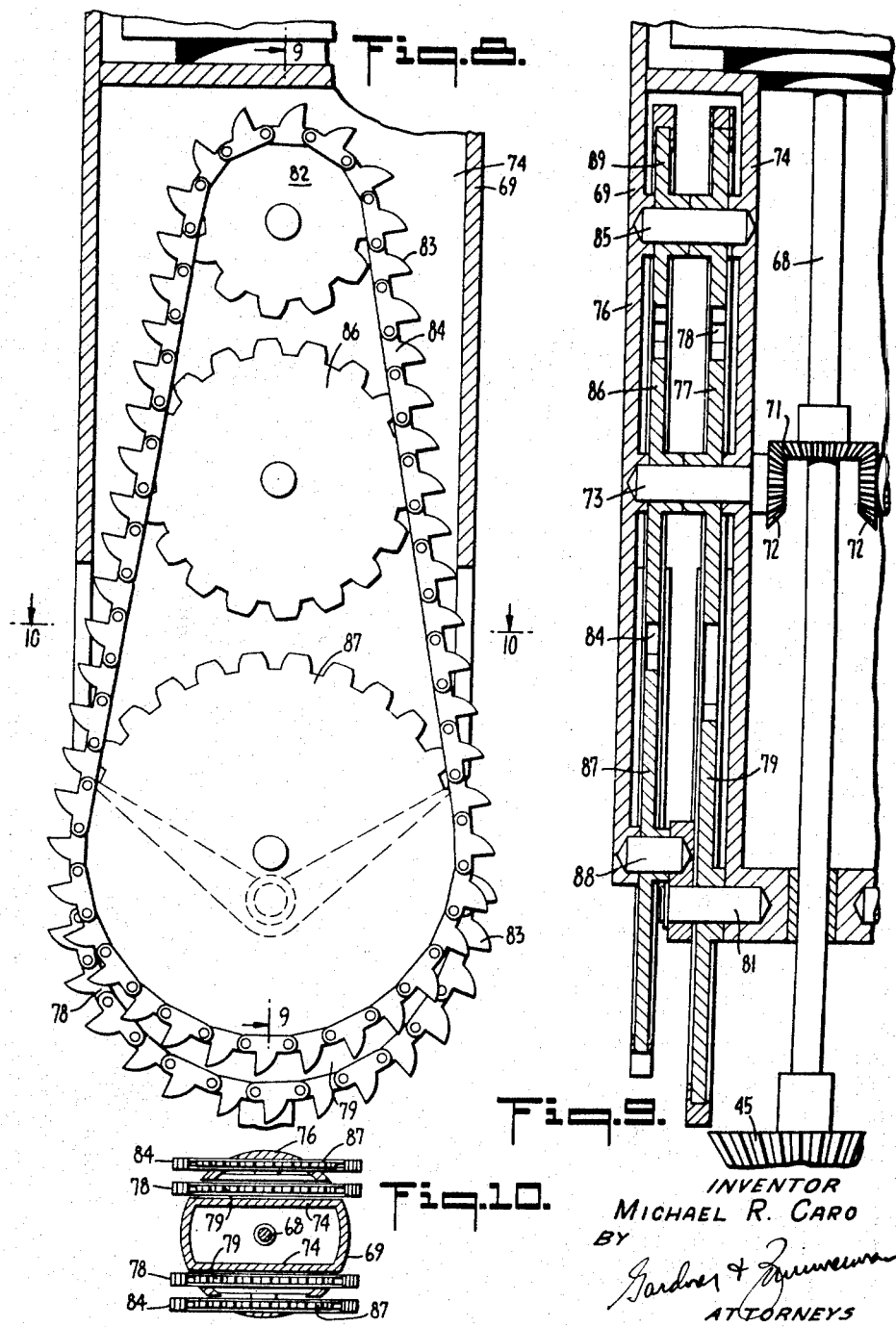

July 9, 1968  M. R. CARO  3,391,751
DRILLING APPARATUS

Original Filed Aug. 6, 1962  4 Sheets-Sheet 4

INVENTOR
MICHAEL R. CARO
BY
*Gardner & Zimmerman*
ATTORNEYS

United States Patent Office 3,391,751
Patented July 9, 1968

3,391,751
DRILLING APPARATUS
Michael R. Caro, 32200 Seneca St.,
Hayward, Calif. 94544
Application Aug. 25, 1966, Ser. No. 574,994, now Patent
No. 3,335,806, dated Aug. 15, 1967, which is a division
of application Ser. No. 482,008, July 9, 1965, which is
a division of application Ser. No. 215,000, Aug. 6, 1962,
now Patent No. 3,215,214. Divided and this application
June 26, 1967, Ser. No. 648,762
2 Claims. (Cl. 175—272)

ABSTRACT OF THE DISCLOSURE

This disclosure describes a drilling head apparatus for use in drilling through rock and earth and which provides a compound rotary movement to cutting tools mounted thereon for increasing the efficiency and speed of drilling operations. The drilling head includes a main housing which is mounted for rotation axially of a bore being drilled. A plurality of cutting tools are mounted on the housing for rotation therewith as well as for powered rotation relative to the housing. A compound rotary movement of the cutting tools is thus provided.

Cross references to related applications

This application is a divisional of application Serial No. 574,994, filed August 25, 1966, for Drilling Apparatus, now Patent No. 3,335,806, which in turn was a divisional of application Serial No. 482,008 (now Patent No. 3,285,351) which was filed on July 9, 1965. The latter application was a divisional of application Serial No. 215,000 filed August 6, 1962, now Patent No. 3,215,214.

Disclosure

This invention relates generally to apparatus for drilling through rock and earth, and more particularly is directed towards a drilling head providing compound rotary movement to cutting tools mounted thereon.

A main object of the present invention is to provide novel and improved drilling apparatus having cutting tools operated with compound rotary movement for increasing the efficiency and speed of drilling operations.

Another object of the invention is to provide drilling apparatus of the character described suitable for reaming in addition to boring operations, and which is thus adapted for forming holes of a relatively large diameter.

A further object is to provide apparatus of the character described having retractable reaming cutters for easy withdrawal of the drilling head from the bore.

Still another object is to provide apparatus of the character described having chain mounted cutting tools for reducing the need for repair and replacement of the cutters.

An even further object is to provide drilling apparatus of the character described suitable for withdrawing core samples.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is an elevation view of a drill head assembly comprising a preferred embodiment of the invention, and shows the assembly boring vertically into the earth;

FIGURE 2 is an enlarged cross-sectional view of the lower portion of the apparatus illustrated in FIGURE 1;

FIGURE 3 is a cross-sectional plan view taken along the plane 3—3 shown in FIGURE 2;

FIGURE 4 is a cross-sectional side view of the retractable cutters of the present invention, and which are also shown in FIGURE 1 as a part of the assembly therein;

FIGURE 5 is a cross-sectional plan view taken along the plane 5—5 in FIGURE 4;

FIGURE 6 is a cross-sectional view taken along plane 6—6 of FIGURE 4;

FIGURE 7 is a cross-sectional view taken along plane 7—7 of FIGURE 4;

FIGURE 8 is a side view illustrating an alternative embodiment of the present invention wherein cutting tools are mounted on a sprocket driven chain;

FIGURE 9 is a cross-sectional view taken along the plane 9—9 in FIGURE 8;

FIGURE 10 is a cross-sectional view taken along plane 10—10 of FIGURE 8;

Figure 11:
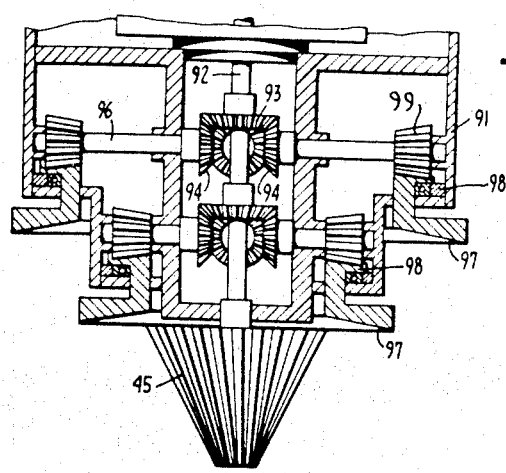
FIGURE 11 is a cross-sectional side view of another alternative embodiment of the invention.

Referring now to the drawings, and to FIGURE 1 in particular, there is shown a drill assembly 11 secured to the lower end of a rotationally fixed drill stem 12 and disposed in a bore 13 being drilled into the earth 14. A motor 16 is mounted on the stem 12 and connected to the assembly 11 for operation thereof in the manner to be described. In broad terms, the assembly 11 includes a main housing 17 which is coupled to the motor 16 through planetary gearing 18 and is adapted for rotation within the bore. A plurality of suitable cutting tools 19 are mounted on the housing for rotation therewith, and, as will become evident, are adapted for powered rotation relative to the housing. Thus it will become apparent that the cutting tools 19 are provided with a compound rotary movement for increasing the speed and efficiency of drilling operations in accord with the foregoing objects of the present invention. It is noted that expandable flexible balloons 21 or the like may be disposed within the bore 13 adjacent the drill stem 12 for stabilization and guidance thereof as the drill descends within the bore.

Reference is now made to FIGURES 2 and 3 wherein is shown a drill head 22 which is depicted in FIGURE 1 as the lowermost portion of the assembly 11. In some detail now, the assembly includes a main shaft 23 which is coupled directly to the motor 16 for powered rotation. A generally tubular housing 24 is rotatably mounted on the shaft 23 concentrically therewith and coupled thereto through the planetary gearing 18 for opposed rotation relative to the shaft 23. More particularly, the planetary gearing 18 is seen to include a sun gear 26 rigidly secured on the shaft 23 for rotation therewith. A ring gear 27 extends inwardly from the housing wall 28 and engages a plurality of planet gears 29 which engage and are actuated by the sun gear 26. The foregoing structure adapts the shaft 23 for rotation in one direction while driving the housing 24 in the opposite direction.

A plurality of rotary cutting tools or cutters 19 are mounted on the housing for rotation therewith and relative thereto. More specifically, each cutting tool is mounted on a cutter shaft 31 journalled for rotation in the bearings 32 and disposed along an axis extending radially relative to the main shaft 23. A spur gear 33 is secured adjacent the end of the shaft 31 proximate the main shaft 23 and engages a drive gear 34 rigidly secured on the shaft 23 for rotation therewith. The rotation of the main shaft 23 relative to the housing 24 thus causes rotation of the cutters 19 relative to the housing. As is shown in FIGURE 3, the cutters 19 are preferably spaced circumferentially around the housing, each being similarly rotated relative to the housing through the gears 33 and 34.

In order to form a generally enlarged bore, it is preferable that the drill head 22 be arranged in axially spaced sets of circumferentially disposed cutters 19, with each set being progressively spaced radially outwardly relative to the adjacent set nearest the end of the drill. More specifically, as shown in FIGURES 1 and 2, there are provided sets 36, 37, 38 and 39 of the cutters 19. The set 37 is seen to be spaced radially outwardly relative to the set 36, which is closest to the lower end of the drill head. The set 38 is similarly spaced relative to the set 37, and likewise with the set 39. To accomplish the foregoing disposition of the cutters 19, the housing 24 is provided with a central tubular wall 41 in which the bearings 32 are disposed for mounting of the cutter shafts 31. An outer housing wall 42 is spaced radially from the inner wall 41 and includes axially spaced stepped portions 43 joined by radially disposed annular portions 44. The bearings 32 are mounted on the stepped portions 43 and the sets of cutters 19 are each disposed respectively around one of the stepped portions. Thus the radial disposition of each set of cutters is seen to correspond to the radial spacing of the stepped portions 43. It will be appreciated that any number of sets of cutters may be utilized in the foregoing manner. Furthermore, a centrally disposed boring drill bit 45 is preferably secured adjacent the lower end of the shaft 23.

In order that particles of earth cut away by the instant drilling apparatus be carried out of the bore 13 suitable channels 46 are provided in the housing 24 for discharging a fluid from the drill head adjacent the cutters 19, this technique being generally well known in the art. Suitable means for transporting the fluid (not shown) are brought down into the bore along with the stem 12 and are coupled to the channels 46 in the housing 24.

Another important feature of the present invention relates to a retractable cutter assembly 47 shown in detail in FIGURES 4 and 5. The assembly 47, which serves primarily as a reamer for enlarging the bore, may be mounted on top of the drill head 22 as shown in FIGURE 1. Cutters 19 similar to that of the previously described drill head 22 are provided with the assembly 47 but are retractable to a position as illustrated in FIGURE 1 for withdrawal of the drill assembly 11 from the bore 13. The assembly 47 includes a generally tubular housing 48 which is rotatably mounted on a central shaft 49. When used in combination with the drill head 22 as shown in FIGURE 1 the housing 48 is rigidly secured to the housing 24 to form a substantially integral part thereof. Similarly, the shaft 49 links directly with the shaft 23 to form in effect a single integral shaft driven by the motor 16. In FIGURE 2 the housing wall 28 and shaft 33 proximate the planetary gearing 18 are shown broken away from the lower portion of the drill head 22. Accordingly, the housing 48 and shaft 49 of the retractable cutter assembly 47 can be disposed intermediate the planetary gearing 18 and drill head 22 forming a substantially integral part of the latter whereby the planetary gearing serves to create rotation of the housing 48 oppositely of the shaft 49.

As regards the detailed structure of the assembly 47, it is seen that the cutters 19 are connected to pinions 33 which engage drive gears 34 secured to the main shaft 49, in generally the same manner as with drill head 22. However, a shaft 51 extending radially from the pinion 33 has a tubular sleeve 52 mounted concentrically thereon and adapted to move axially relative thereto. As shown in FIGURE 6 the shaft 51 is preferably of generally rectangular cross-section, and the sleeve 52 has its inner walls of complementary rectangular configuration whereby the shank is in effect keyed to the shaft 51 to rotate therewith. The cutter 19 is connected to the sleeve 52 and thus rotates in accordance with the pinion 33 but is adapted to move radially relative to the housing as the sleeve 52 moves axially on the shaft 51. A pair of spaced confronting collars 53 are rotatably mounted around the shank 52, which has a circular periphery as shown in FIGURE 6, and are retained from axial movement relative to the sleeve by axially spaced annular ridges 54 extending radially outwardly on the sleeve. An actuating arm 56 is pivotally secured to the housing 48 and adapted to move in a plane parallel to the axes of the shafts 49 and 51, the arm 56 having an aperture 57 through which passes the sleeve 52. By having the arm 56 disposed intermediate the spaced collars 53 pivotal movement of the arm imparts an axial movement to the sleeve 52 relative to the shaft 51, inasmuch as the collars are restrained by the ridges 54 from axial movement on the sleeve. Thus the actuating arm is seen to provide means for imparting radial movement to the cutters 19 relative to the housing 48.

Means for moving the actuating arm 56 include a plate 58 mounted on the shaft 49 for axial movement on a threaded portion 59 thereof. The plate 58 is restrained from rotation relative to the housing 48 so that when engaging the threaded shaft portion 59 the rotation of the shaft 49 causes the plate 58 to move axially thereon. The periphery of the plate 48 abuts radially against the inclined actuating arm, as shown in FIGURE 4, and downward movement of the plate forces the arm radially outwardly, which moves the cutters 19 accordingly. Preferably a plurality of cutters 19 and arms 56 are disposed around the assembly 47, as for example in the quadrant positions shown in FIGURE 5. Radially extending ridges 61 are provided on the plate 58, as shown in FIGURE 7, which extend intermediate the arms 56 whereby the plate is restrained from rotational movement relative to the housing 48, as noted above, but is adapted to move axially relative thereto.

It will be appreciated that once the cutters 19 of the assembly 47 are in either their fully extended or fully retracted position the plate 58 must be adapted to remain axially stationary relative to the shaft 49. Accordingly, radially extending annular flanges 62 are disposed on the shaft 49 adjacent each end of the threaded portion 59 and spaced therefrom to define unthreaded shaft portions 63. When the plate 58 has moved axially along the portion 59 from one end thereof to the other it then becomes disposed on one of the portions 63 about which it may rotate freely without stripping the threads. Spring means 64 are provided adjacent each flange 62 for urging the plate 58 on to the threaded portions 59. However, notwithstanding the spring means 64, once the plate has moved axially along the portions 59 to become disposed on a portion 63, the plate cannot move back into threaded relationship with the portion 59 because of the direction of relative rotation thereof. When the direction of shaft rotation is reversed relative to the housing, as for example when the drill is to be removed from the hole, the plate 58 is urged back on to the threaded portion 59 and moves axially to the other end thereof where it again becomes disposed on the portion 63 until further reversal of shaft rotation.

Tension spring means 66 are connected between the cutter shafts 51 and the cutters 19 to urge the cutters into a retracted position when the member 58 is moved upwardly on the shaft 49. Further compression spring means 67 may also be provided to urge the actuating arms into their retracted position and assist the operation of the spring means 66.

An alternative embodiment of the invention having chain mounted cutting tools is shown in FIGURES 8, 9 and 10 of the drawings. In this embodiment a shaft 68 has a housing 69 rotatably mounted thereon similar to the drill head 22, and planetary gearing (not shown) is likewise utilized to effect contra rotation of the shaft and housing. A drive gear 71 is secured on the shaft 68 and engages pinions 72 which are connected to shafts 73 journaled in the housing 69. The housing 69 is seen to include an inner wall 74 and a spaced outer wall 76 with the shafts 73 extending therebetween. A first drive sprocket 77 is mounted on shaft 73 for rotation therewith and is adapted to drive a chain 78. An idling cutter sprocket 79 is disposed adjacent the lower end of the housing and mounted on a stub shaft 81 journalled in the housing 69. The sprocket 79 is adapted to be driven by the chain 78, which engages the drive sprocket 77 as well as a third idler sprocket 82 mounted on a stub shaft 85. By mounting a plurality of spaced cutting tools 83 along the chain 78 the instant embodiment of the invention is adapted for boring and reaming operations with the cutters having a compound rotary movement in the manner of the invention. By having a plurality of cutters along a relatively large chain in the foregoing manner the need for replacement or repair of the cutters is greatly reduced.

To provide for drilling of larger holes a second cutting chain 84 similar to the chain 78 is spaced outwardly therefrom. As best seen in FIGURES 9 and 10 a second drive sprocket 86 is mounted on the shaft 73 and spaced outwardly from the sprocket 77. An idling cutter sprocket 87 of substantially the same diameter as the sprocket 79 is mounted adjacent the sprocket 79 on a stub shaft 88 and spaced therefrom. The sprocket 87, however, is disposed axially upwardly relative to the sprocket 79 whereby the chains 78 and 84 operate to cut into the earth to form a progressively larger hole in much the same manner as do the cutters 19 of the assembly 11. The chain 84 similarly engages a third idler sprocket 89 mounted on the shaft 85. It is preferred that similar cutting chains 78 and 84 to be mounted on the diametrically opposed side of the housing 69 as appears in FIGURE 10.

Another alternative embodiment of the invention is shown in FIGURE 11 and is seen to include a housing 91 rotatably mounted on a shaft 92, the housing and shaft being adapted for contra rotation in the manner previously described. Drive gears 93 are secured to the shaft and engage pinions 94 which are secured to cutter shafts 96 journalled in the housing 91. Ring cutters 97 circumscribe the housing 91 and are adapted for rotation relative thereto. The cutters 97 include ring gear portions 98 which engage pinions 99 secured to the shafts 96 thus adapting the cutters for driven rotation relative to the housing.

Figure 12:
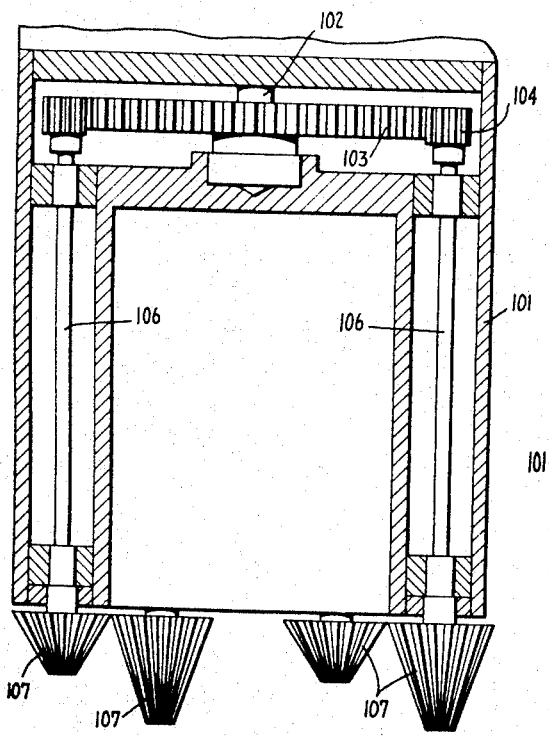
FIGURE 12 is a cross-sectional side view of a further alternative embodiment of the invention which is particularly suitable for reaming operations.

A further alternative embodiment of the invention is illustrated in FIGURE 12 and includes a generally tubular housing 101 rotatably mounted on the shaft 102 and adapted for contra rotation relative thereto in the manner previously described. A circular drive gear 103 is secured to the shaft 102 and engages pinions 104 disposed circumferentially around the housing 101. The pinions 104 are adapted to drive a plurality of cutter shafts 106 journalled in the housing for rotation about an axis parallel to that of the shaft 102. A plurality of circumferentially disposed cutters 107 are secured adjacent the lowermost ends of the shafts 106 proximate the lower end end of the housing 101. While the embodiment in FIGURE 12 is shown without a central lowermost boring cutter 45 as included in the other embodiments it will be appreciated that such provision can be readily made as previously described. As shown the instant embodiment is particularly suitable for reaming operations wherein the central boring cutter is not needed. Preferably the cutters 107 are provided with alternate ones being longer than the others as is evident in FIGURE 12.

Figure 13:
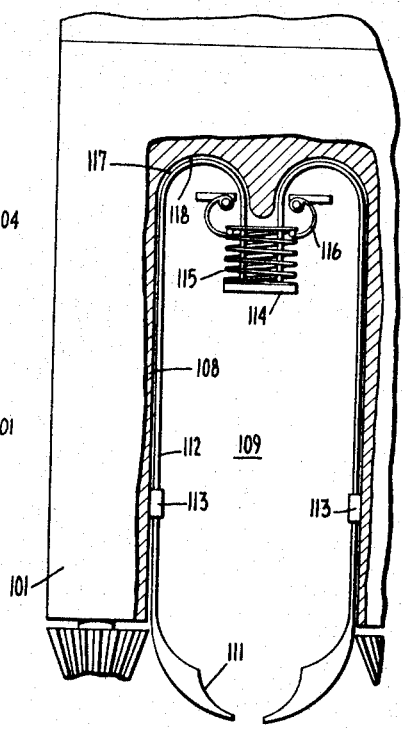
FIGURE 13 illustrates still another alternative embodiment of the invention suitable for extracting core samples.

In FIGURE 13 there is shown a modification of the embodiment in FIGURE 12 whereby the instant apparatus is adapted for withdrawing a core sample from the bore. More particularly, the housing 101 is seen to have an inner wall 108 defining a central chamber 109. At least two core cutting blades 111 are disposed adjacent the lower end of the chamber and are adapted to move radially inwardly to close off the chamber. The blades 111 are preferably constructed of spring steel or the like and include flexible upper portions 112 extending upwardly adjacent the wall 108 of the chamber. The portions 112 are retained by guide members 113 secured to the wall 108 and are thereby adapted to move axially relative to the chamber. The blades 111 are secured to the upper portions 112 in a position normally extending radially inwardly as shown in FIGURE 13. However, as the portions 112 are moved upwardly in the guide members 113 the blades are retracted radially outwardly to open the lower end of the chamber. When the portions 112 are moved downwardly the blades accordingly move radially inwardly to close off the chamber and sever the lower end of any core of earth retained therein. Means for axially moving the upper portions 112 and thus the blades 111 include a centrally disposed axially movable plate 114 disposed within the chamber adjacent the upper end thereof. Spring means 115 are secured to the housing wall 108 by means of clips 116 or the like and are adapted to normally urge the plate downwardly in the chamber. Flexible arcuate portions 117 extend integrally from adjacent the upper portions 112 and connect to the plate 114 for movement therewith. As the arcuate portions 117 are preferably integral with the portions 112 and also made of spring steel they are adapted to transmit upward force from the plate 114 into downward force on the portions 112. More specifically, the arcuate portions 117 are disposed adjacent an upper concave wall 118 of the housing 101 and adapted to move flexibly therealong. Thus as the plate 114 urges one end of the portion 117 upwardly it moves arcuately along the wall 118 and results in downward movement of the portion 112. As the housing 101 cuts into the earth a core of earth will be formed within the chamber 109, and when the top of the core engages the plate 116 the plate is moved upwardly relative to the housing. The force on the plate is then transmitted to the blades 111 as described in the foregoing whereby the blades move radially inwardly to sever off the core. The housing may then be removed from the bore and the core extracted by flexibly bending back the blades 111.

In the general operation of the apparatus of the present invention it will be appreciated that a compound rotary movement is imparted to variously disposed cutting tools of varied configurations. In the embodiments of FIGURES 1 and 8 the cutters are generally adapted for rotary movement about an axis normal to that of the main drive shaft. By suitably gearing the transversely disposed cutter shafts with the main drive shaft the nature of cutter rotation relative to the housing may be predetermined. More specifically, referring to FIGURE 9, variations in the sizes of the drive gear 71 and pinion 72 will accordingly vary the speed of the cutter chains relative to the housing. Also, by having the pinion 72 engage the drive gear 71 adjacent the top thereof, instead of the bottom as shown, the direction of cutter rotation relative to the housing can be reversed. Accordingly it is apparent that variation in the cutter movement relative to the stationary earth can be achieved in the foregoing manner.

What is claimed is:

1. Drilling apparatus comprising, in combination, a shaft adapted for powered rotation, a tubular housing rotatably mounted concentrically on said shaft and connected thereto for rotation oppositely of said shaft, a plurality of rotary cutting tools rotatably mounted on said housing exteriorly thereof and each connected to said shaft for rotation relative to said housing about an axis normal to that of said housing, some of said cutting tools being adapted for radial movement relative to said housing, an actuating arm secured to said housing and adapted to move said radially movable tools radially relative to said housing, and a member threadedly mounted on said shaft for axial movement thereon and adapted to engage said actuating arm for movement thereof to move said cutting tools radially as said member travels axially on said shaft.

2. Drilling apparatus comprising, in combination, a main shaft adapted for powered rotation, a tubular housing rotatably mounted concentrically on said shaft and connected thereto for rotation oppositely of said shaft, a drive gear secured to said shaft for rotation thereon, a pinion mounted in said housing for rotation about an axis extending radially from said shaft and engaging said drive gear, a second shaft extending radially outwardly from said pinion for rotation therewith, a tubular sleeve mounted concentrically on said second shaft and keyed for rotation therewith, said sleeve being axially movable on said second shaft for radial movement relative to said main shaft, a cutting tool disposed exteriorly of said housing and mounted on said sleeve for rotation and translation therewith, an actuating arm pivotally secured to said housing for movement in a plane extending through the axes of said main and second shafts, said arm engaging said sleeve for moving same axially on said second shaft as said arm is pivoted, said main shaft having a threaded portion proximate said arm, a spreader plate mounted on said shaft and adapted to move axially on said threaded portion thereof, means for restraining said plate from rotation relative to said housing, said plate engaging said arm for movement thereof as said plate moves axially on said shaft, and means for urging said plate into threaded engagement with said threaded portion.

References Cited

UNITED STATES PATENTS

| | | | |
|---|---|---|---|
| 1,391,626 | 9/1921 | Gilthorpe | 175—101 X |
| 1,822,216 | 9/1931 | Hartson | 175—286 X |
| 1,878,260 | 9/1932 | Bunker | 175—289 X |
| 1,904,522 | 4/1933 | Pippin | 175—319 X |
| 2,797,065 | 6/1957 | Houston | 175—272 |

DAVID H. BROWN, *Primary Examiner.*